Patented May 11, 1948

2,441,238

UNITED STATES PATENT OFFICE 2,441,238

CONVERSION OF MALEIC ACID TO FUMARIC ACID

Andrew P. Dunlop, Riverside, Ill., assignor to The Quaker Oats Company, Chicago, Ill., a corporation of New Jersey No Drawing. Application December 22, 1944, Serial No. 569,419

6 Claims. (Cl. 260—537)

The present invention relates to a process for producing fumaric acid from maleic acid, and particularly to a process whereby the maleic acid is converted, in practically quantitative yields, to fumaric acid of a high degree of purity.

The present application is a continuation-in-part of my previous application, Serial No. 486,449, filed May 10, 1943, now abandoned.

It has been reported in the literature that fumaric acid results when maleic acid is heated alone or in aqueous solution. Various catalysts have been proposed for this transformation, such as hydrochloric, hydriodic and nitric acids and potassium thiocyanate.

The process of the present invention is essentially an improvement in the method of carrying out the conversion through the agency of heat. I have found it possible to conduct the heating process so as to obtain a product which is essentially all fumaric acid. When carried out in the presence of air or oxygen, however, such a process yields fumaric acid which is somewhat dark in color and, therefore, of little commercial value. I have found that such dark colored fumaric acid can be purified by washing with water. This treatment, although simple, does, of course, involve considerable time and expense, and is accompanied with the inevitable loss of product in the solvent.

It is one of the objects of the present invention to provide a process whereby maleic acid is converted to fumaric acid by heat in such a manner that no subsequent purification of the product is required. More specifically, the process involves the heat treatment of maleic acid in a gaseous non-oxidizing medium to produce practically quantitative yields of fumaric acid of a high degree of purity. The temperature can be varied over a wide range but I prefer to operate within the range 145–260° C. Lower temperatures may be employed but the rate of conversion then becomes too slow to be of commercial value. Higher temperatures may be employed and the process has been operated successfully at the indicated temperature of 260° C. It is quite probable that by employing a flash process, even higher temperatures could be used to bring about the desired transformation.

The primary object of the present invention is to produce an immediately saleable, dry fumaric acid from a form of maleic acid, which comprises removing absorbed oxygen from the particular form of maleic acid which is employed as a starting material, confining the said form of maleic acid in a gaseous non-oxidizing atmosphere, and heating it therein to a temperature within the above-mentioned range for a time sufficient to convert substantially all of it into fumaric acid of a high degree of purity.

The term "non-oxidizing atmosphere" is used herein to denote an environment which is devoid of oxygen as such or in a form capable of oxidizing maleic acid or fumaric acid under the conditions employed during the conversion process. In addition to this, the non-oxidizing medium must be such as not to act upon any of the possible intermediate products in a way to prevent the final formation of fumaric acid. Examples of such non-oxidizing gaseous media are nitrogen, carbon dioxide, hydrocarbon vapors, vapors of ethers, etc., which are non-reactive with either maleic or fumaric acids. I do not wish to be limited to these examples since other suitable non-oxidizing media will be readily apparent to those skilled in the art. Examples would be the inert gases such as helium, argon, neon, etc.

The function of the non-oxidizing gaseous medium is to avoid substantially all contact of the reaction mixture with oxygen.

In carrying out my process, I can use as the starting material either maleic acid or maleic anhydride to which water has been added in amounts at least equal to that theoretically required to form maleic acid therewith.

To illustrate the invention more clearly, I will now describe an experiment which demonstrates conclusively the advantages of employing a process involving the use of a non-oxidizing atmosphere for the conversion of maleic acid into fumaric acid.

For purposes of comparison three containers were employed. These containers were made of glass and each received a charge of 10 parts by weight of maleic acid. The first container was then sealed in air at atmospheric pressure, thus providing an atmosphere of ordinary air about the maleic acid. A second container was treated as follows: pure oxygen gas was passed through the container for about one half hour in order to sweep out the air therein, and to insure the presence of an atmosphere of substantially pure oxygen, whereafter the container was sealed off. A third container had nitrogen gas passed through it for one half hour, in order to sweep out all traces of air and oxygen, whereafter it was sealed off.

The three containers, each containing 10 parts by weight of maleic acid, differed from each other in the following respects, in that the first container merely contained air at atmospheric pressure, the second container contained oxygen at atmospheric pressure, and the third container contained nitrogen at atmospheric pressure. The three containers were placed in a suitable heating bath and heated to a temperature between 195 and 210° C., being kept at that temperature for a period of two hours, after which the containers were cooled down, opened and the contents of each tube pulverized and examined.

It was found that in all three cases there had been a substantial conversion of the maleic to the fumaric acid. This was not surprising, as the conversion of maleic acid to fumaric acid by heat is in itself well known. The difficulties of the prior art methods, however, were plainly in evidence, particularly in connection with the first and the second tubes. In the fumaric acid which was the result of heating container No. 1, which contained the air, was a product which was light tan in color, and which therefore would not have been immediately usable and saleable, and would have required recrystallization and other methods of purification, which would have entailed loss and expense. The second container, which contained the pure oxygen, produced a product which was of a dark tan color and therefore would have required a considerable amount of purification, if in fact it could have been brought to a white condition at all.

On the other hand, the third container, which exemplifies the preferred embodiment of the present invention, produced a product which was dazzingly white, and which had a sharp melting point of 294° C. The melting point of the other two samples (i. e. from containers 1 and 2) was not sharp and lay between 292 and 294° C. These samples were compared with an authentic sample of pure fumaric acid which melted sharply between 294 and 294.5° C. By making mixed melting point determinations, it was found that the products from the tubes containing air or oxygen lowered the melting point, while the product from the tube containing nitrogen showed no depression of the melting point of the authentic sample of the fumaric acid, this indicating the degree of purity of the product obtained in carrying out the process of the present invention.

Other inert gases such as helium, neon, carbon dioxide, etc., may be substituted for the nitrogen. Similarly, the use of low boiling liquids in vapor form such, for example, as the vapor of ethyl ether and substantially inert hydrocarbons such as methane, ethane, propane and butane, will yield results substantially like those obtained by the use of nitrogen.

For convenience, however, either nitrogen or carbon dioxide is the most practical gas for the carrying out of the present invention. Applicant is aware of the fact that the mere thermal conversion of maleic acid into fumaric acid has long been known and also that the heating of maleic acid in aqueous solution results in the formation of some fumaric acid, but the reaction is by no means complete, and undesirable by-products form.

It had also been proposed in the prior art to convert maleic acid into fumaric acid while dissolved in benzene. However, under those conditions the maleic acid first passed into solution, then apparently became converted at least in part into fumaric acid, and eventually there was a formation of fumaric acid. There was, however, still present a certain amount of unchanged maleic acid, and moreover it was necessary to remove the benzene from the formed fumaric acid, and to effect an expensive and painstaking separation of the latter from any unchanged maleic acid. With applicant's process, however, when worked between the limits of 145 and 260° C., the conversion of the maleic acid to the fumaric acid is quantitative and the product obtained is pure white, dry and immediately saleable.

It is of course possible to utilize maleic anhydride as the starting point, adding the calculated amount of water, placing the mixture in a sealed tube, and heating it in the inert gas. Under these conditions, the maleic anhydride becomes converted into maleic acid which then is converted, as a result of the heating, into the desired end product, that is, fumaric acid.

The exact apparatus to be employed is of course a matter of choice, and is well known to those familiar with chemical technology.

The term "form of maleic acid" is used in the claims to cover both maleic acid itself or its anhydride in admixture with sufficient water to hydrate it to maleic acid.

I claim:
1. Process of producing dry, pure white fumaric acid having a sharp melting point of about 294° C. from maleic acid which comprises placing maleic acid in a closed container, removing air from said container by means of an inert gaseous fluid and also thereby removing the adsorbed oxygen from said maleic acid, leaving an atmosphere of inert gaseous fluid in said container in contact with the maleic acid, and while maintaining said inert gaseous fluid in contact with the maleic acid, heating it to a temperature within the range of about 145° C. to about 260° C. until said maleic acid has been substantially completely converted into said pure white sharply melting fumaric acid.

2. The process as defined in claim 1 in which the maleic acid is initially dry.

3. The process as defined in claim 1 in which the gaseous fluid is nitrogen.

4. The process as defined in claim 1 in which the gaseous fluid is carbon dioxide.

5. The process as defined in claim 1 in which the gaseous fluid is an aliphatic hydrocarbon vapor having less than 5 carbon atoms.

6. The process as defined in claim 1 in which the maleic acid is produced in situ from its anhydride by a sufficient quantity of water to convert said anhydride to maleic acid.

ANDREW P. DUNLOP.

REFERENCES CITED

The following references are of record in the file of this patent:

UNITED STATES PATENTS

| Number | Name | Date |
|---|---|---|
| 974,182 | Phelps | Nov. 1, 1910 |
| 1,424,138 | Bailey et al. | July 25, 1922 |
| 1,491,465 | Craver | Apr. 22, 1924 |
| 1,900,649 | Jaeger | Mar. 7, 1933 |
| 1,901,914 | Livingston | Mar. 21, 1933 |
| 2,208,519 | Spence et al. | July 16, 1940 |
| 2,315,529 | Kelso | Apr. 6, 1943 |

OTHER REFERENCES

Gmelin, "Handbook of Chemistry" (Cavendish Society 1853), vol. 8, pages 152–153.

(Other references on following page)

Tanatar, Liebigs Annalen, vol. 273, pages 31–36 (1893).

Pelouze, Beilstein, Handbuch der Organic Chemistry, vol. 2, page 738 (1920).

Beilstein, 4th ed. (1920), vol. 2, page 738.

Beilstein, 4th ed. (1929), vol. 2, page 300.

Vaidya, Proc. Royal Society (London) A129, pages 299–313 (1930).

Kistiakowsky et al., J. Am. Chem. Soc., vol. 54, pages 2208–2214 (1932).

Tomamusi et al., Chemical Abstracts, vol. 32, page 500 (1938).

Tomamusi et al., Zeit Elektrochem, vol. 45, pages 72–79 (1939).

Beilstein, 2nd Suppl. (4th ed. 1942), vol. 2, page 632.

Pfeiffer, Berichte (Deutsch. Chem. Gesell.), vol. 47, page 1592.